Feb. 28, 1967  D. F. ZIERS  3,306,603
HOLDING APPARATUS FOR SHEET MATERIAL
Filed March 19, 1965  2 Sheets-Sheet 2
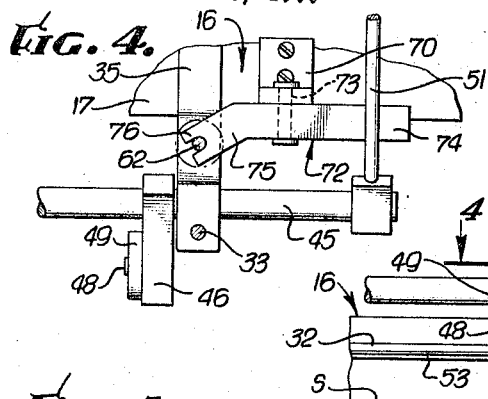
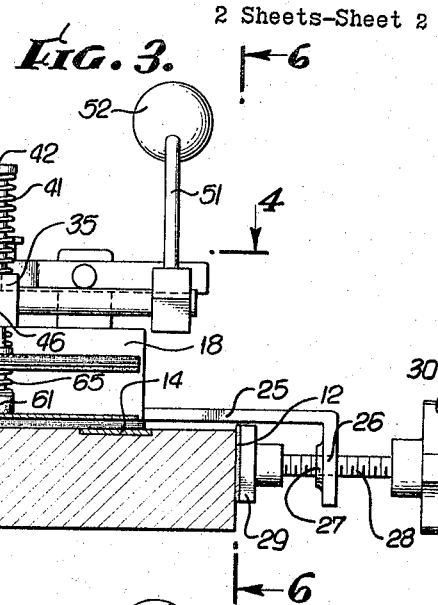
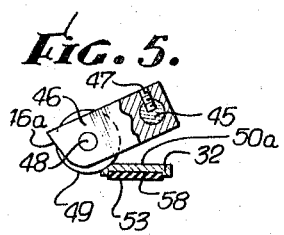
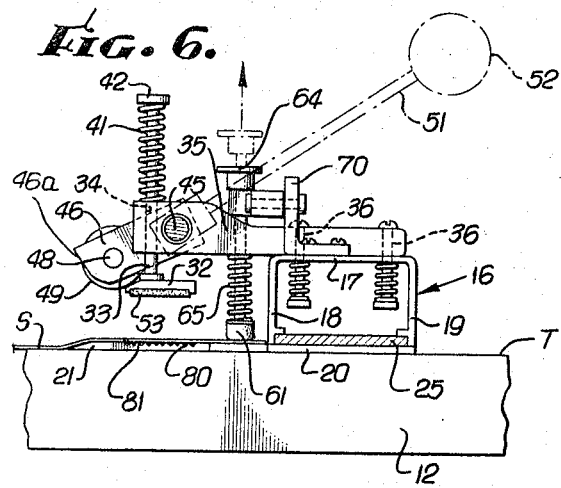
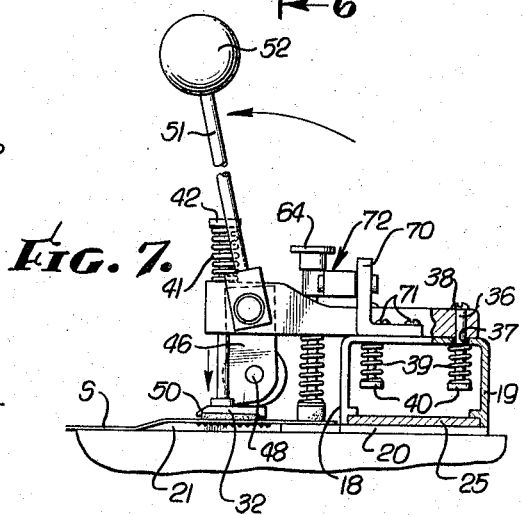
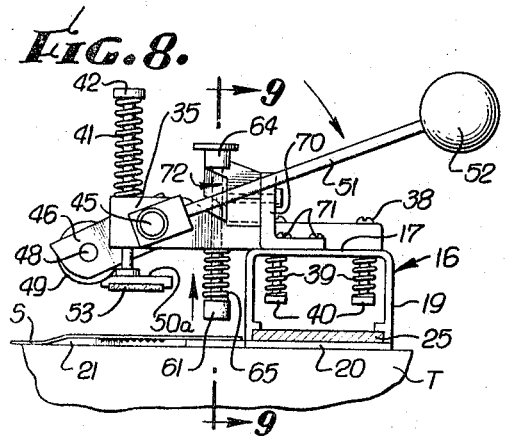
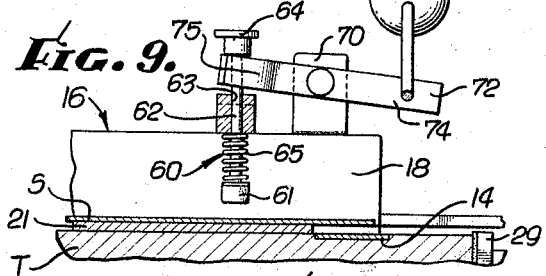
DAVID F. ZIERS
INVENTOR
BY Bernard Kriegel
ATTORNEY.

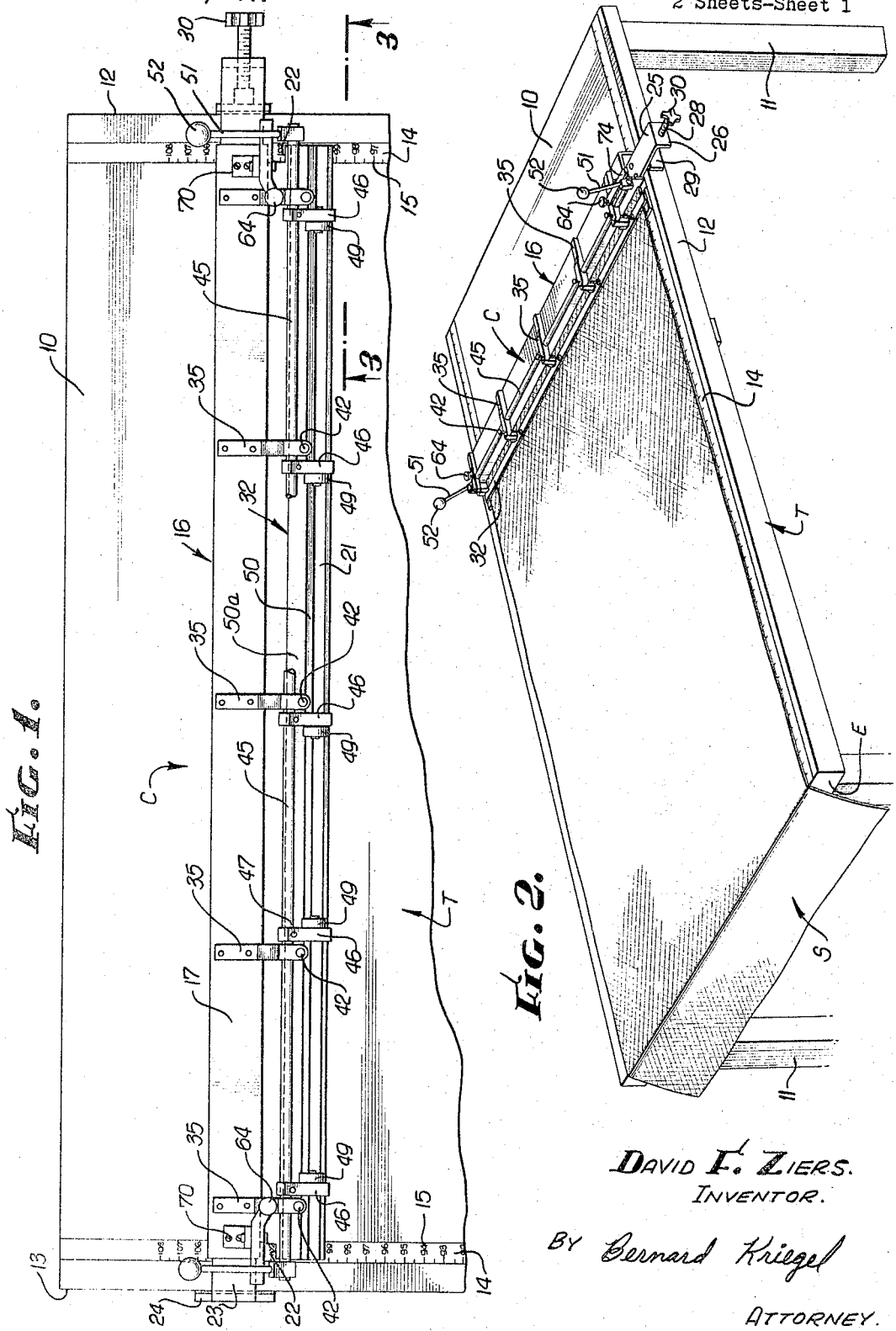

United States Patent Office

3,306,603
Patented Feb. 28, 1967

---

3,306,603
HOLDING APPARATUS FOR SHEET MATERIAL
David F. Ziers, Monterey Park, Calif., assignor to Manufacturing Specialties Co., Inc., Gardena, Calif., a corporation of California
Filed Mar. 19, 1965, Ser. No. 441,201
18 Claims. (Cl. 269—91)

The present invention relates to apparatus for retaining sheet material on a measuring table, or the like, and more particularly to apparatus for releasably securing drapery material to the table to facilitate its measurement and cutting to the desired length.

Heretofore, apparatus has been provided for clamping drapery sheet material, and the like, to a suitable surface, such as a table, for the purpose of properly cutting the material to the required length. Such prior apparatus has been relatively complex, costly to manufacture, and difficult to operate, requiring many operations in arranging the material on and clamping it to the table and in releasing it therefrom, as well as many steps by the operator in repeatedly moving from one side of the table to the opposite side. At times, the drapery material would not be held securely across its entire width due to variations in its thickness. As an example, a relatively thick seam in the material would preclude proper functioning of the equipment. Another difficulty revolved around the inability of the apparatus to securely clamp materials of different thicknesses, ranging from the thinnest of drapery material to relatively thick materials.

Accordingly it is an object of the present invention to provide apparatus for clamping drapery and other sheet material which is relatively simple, strong and sturdy, economical to manufacture and easy to operate, both in effecting the clamping action and in releasing the material from the apparatus.

Another object of the invention is to provide apparatus for clamping drapery and other sheet material which is capable of securely clamping or retaining materials of a wide variety of individual thicknesses.

A further object of the invention is to provide apparatus for clamping drapery and other sheet material along its entire width despite variations in thickness of the material along the apparatus.

An additional object of the invention is to provide apparatus for releasably clamping drapery and other sheet material in which the clamping action along the entire length of the apparatus can be released from either end of the apparatus, thereby saving the operator many steps.

Yet another object of the invention is to provide apparatus for releasably clamping drapery and other sheet material, in which the material can be preliminarily held in place by a plurality of devices operated from the sides of the sheet material, after which the material is clamped in place across its whole width, and in which release of all clamping members from the sheet material is effected simultaneously from either side of the material.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 1 is a top plan view of a clamping apparatus mounted upon a table;

FIG. 2 is an isometric projection of the apparatus mounted on the table, with sheet material disposed on the latter and with its end portion clamped in the apparatus;

FIG. 3 is an enlarged section taken along the line 3—3 on FIG. 1;

FIG. 4 is a section taken along the lines 4—4 of FIG. 3;
FIG. 5 is a section taken along the lines 5—5 on FIG. 3;
FIG. 6 is a section taken along the lines 6—6 on FIG. 3;
FIG. 7 is a view similar to FIG. 6 disclosing the apparatus in clamping position;
FIG. 8 is a view similar to FIGS. 6 and 7 illustrating the apparatus in still another position for simultaneously releasing all clamping elements from the sheet material;
FIG. 9 is a section taken along the lines 9—9 of FIG. 8.

As disclosed in the drawings, it is desired to clamp an end margin of sheet material S, such as drapery material, to a suitable work table T at a desired distance from an end E of the table at which the drapery material can be severed to the appropriate length. The table can assume any desired form, and includes a table top 10 and supporting legs 11, the sides 12, 13 of the table being parallel to one another and its end E being normal or at right angles to the parallel sides. A suitable scale 14 is provided on the table top adjacent to each of its sides for the purpose of measuring the distance of a clamping or holding apparatus C from the forward end of the table. The distance indicia 15 on each scale increases in a direction away from the forward end E of the table, as illustrated in FIG. 1.

The clamping and holding apparatus C includes a main, elongate body 16 slidable along the upper surface of the table and having a length corresponding to the width of the table. As disclosed, the body 16 is actually of a slightly lesser length than the table width. The body is of hollow, box-like configuration, as shown most clearly in FIGS. 6, 7 and 8. As specifically illustrated, it includes an upper web 17 merging into forward and rearward depending walls 18, 19 which are suitably secured to a base portion 20. This base portion extends forwardly of the forward leg or wall 18 to a substantial extent and extends along the entire length of the body to provide a foot portion 21 upon which the drapery material can be placed. The base portion is slidable along the table top 10 and is at right angles to the forward vertical wall 18 of the body. The ends of the base portion adjacent to the forward wall are provided with openings 22 overlying the scales 14 at opposite sides of the table through which the indicia 15 can be viewed, the rear of each opening 22 culminating at the vertical body wall 18, which can be placed in alignment with a selected measurement indication.

A bracket 23 is suitably secured to the base portion 20 of the body at one of its ends, this bracket being welded, or otherwise suitably attached, to a vertical head 24 adapted to engage one side 13 of the table. The inner surface of this head is at right angles to the body 16 of the apparatus, the head and body being in the nature of a T-square such that flush engagement of the head 24 against the side 13 of the table disposes the forward wall 18 of the body at the right angles to the sides 12, 13 of the table.

Another bracket 25 is suitably secured to the other end portion of the body base 20 and is adapted to extend substantially beyond the other side 12 of the table. This bracket including a depending leg 26 spaced outwardly from the side 12 of the table. This leg has a threaded boss 27 threadedly receiving a shank 28 of a clamping device, the inner end of the shank being swivelly secured to a clamp bar 29 adapted to bear against the side 12 of the table opposite the head 24. A suitable handle or wheel 30 is secured to the outer end of the threaded shank 28 which can be turned in the appropriate direction to shift the clamp member 29 against the side 12 of the table and draw the head 24 fixed to the body against the opposite side 13 of the table for the purpose of firmly securing the body 16 to the table at the appropriate location therealong and with the forward wall 18 of the body normal to the sides of the table.

The drapery or other sheet material S is placed upon the table top and its end portion placed over the foot 21 of the body with the terminus of the material engaging the vertical forward body wall 18. The drapery material can then be clamped against the foot portion by moving a horizontal pressure bar 32 downwardly thereagainst, which pressure bar overlies the foot 21 of the base. As shown, the pressure bar 32 is substantially coextensive in length with the body 16 and is secured at a plurality of spaced points along its length to vertical guide rods 33 that extend slidably through guide bores or holes 34 in the forward portions of pillar blocks or arms 35 overlying the body 16 of the tool and yieldably secured thereto. As shown, a pair of fastening members 36 extend through each pillar block 35 and through holes 37 in the upper web portion 17 of the body to the interior of the latter. The outer heads 38 of the fastening members engage the upper surface of a pillar block 35 and a helical compression spring 39 encompasses the shank of each connecting member 36, its upper end engaging the inner surface of the web 17 and its lower end bearing against a head 40 secured to the fastening member, so as to urge each fastening member 36 downwardly and yieldably retain the pillar block or arm 35 against the upper surface of the body 16. Each guide rod 33 is normally urged in an upward direction, to hold the pressure bar 32 in an upward position spaced above the foot 21, by a helical compression spring 41, the lower end of which bears against the upper surface of the pillar block 35 and the upper end of which bears against a guide rod head 42. Thus, the springs 41 yieldably support the guide rods 33 and pressure bar 32 in an upper position with respect to the pillar block.

The pressure bar 32 is urged downwardly to clamp the sheet material S between it and the foot portion 21 of the body by a pressure applying actuating mechanism that includes a horizontal rod or shaft 45 extending through the pillar blocks 35 forwardly of the box-like portion of the body 16 and rotatably therewithin. A plurality of arms 46 are secured to the shaft, as by means of set screws 47, each arm preferably being located adjacent to a pillar block 35. Such arms 46 are normally disposed transversely of the pressure bar 32 and are inclined in a downward and forward direction with respect thereto. They each have a horizontal pin 48 secured to an outer lower end on which a pressure roller or clamp wheel 49 is rotatably mounted, this roller being adapted to engage the upper surface of the pressure bar. Initially, a roller 49 will engage a forward beveled upper corner 50 of the pressure bar, and will then ride upon a flat upper surface 50a of the pressure bar in moving it downwardly against the sheet material S, the arms 46 riding over center with respect to the operating shaft 45 so as to retain the bar 32 in its lower position clamped against the sheet material S, as disclosed in FIG. 7. The pressure bar 32 is shifted downwardly against the force of the helical springs 41 acting upon the guide rods 33 and tending to shift the guide rods in an upward direction. When the arms 46 and rollers 49 are shifted in an upward direction from the pressure bar 32, the springs 41 will reelevate the latter to its initial position.

The shaft 45 can be turned in either direction and from either side of the clamp body 16 and table T. As shown, a connector or block 50 is suitably secured to each end of the shaft 45, there being an actuating lever operator 51 suitably attached to the connector or block, the outer end of each lever having a knob or handle 52 secured thereto which is to be grasped by the hand of a person operating the mechanism. When the lever operator 51 is in its downward position, such as disclosed in broken lines in FIG. 6, the pressure bar 32 is released from the sheet material S and elevated thereabove. Actuation of a lever operator 51 from either side of the mechanism in a forward direction, or counterclockwise direction as seen in FIGS. 6 and 7, will turn the operating shaft 45 to shift the lever arms 46 downwardly, causing the rollers 49 to engage the pressure bar 32 and shift it downwardly against the force of the springs 41 for the purpose of clamping the sheet material S against the foot 21 of the body. To facilitate the clamping action, an elastic pad 53, of rubber or the like, is cemented or otherwise suitably secured within a longitudinally groove 54 in the pressure bar 32, the pad extending below the latter. The lever 51 is shifted to the position illustrated in FIG. 7, in which the arms 46 hold the pressure bar 32 firmly downwardly against the sheet material S, the springs 41 being incapable of shifting the pressure bar upwardly since the pins 48 on which the rollers 49 are mounted are disposed rearwardly of a vertical plane passing through the axis of the shaft 45, with the plane of action of the springs 41 being forwardly of the vertical shaft. In other words the arms 46 have been shifted over center in the nature of a toggle joint, so that the springs 41 are incapable of swinging the arms to their upper position. The clamping movement of the arms 46 is limited by engagement of their ends 46a with the upper surface 50a of the clamp bar 32.

Prior to actuation of the pressure bar 32 against the sheet material S, the latter can be placed in appropriate position upon the foot 21 and against the vertical wall 18 of the body 16 and held in such position. As shown, a gripper member 60 is slidable vertically in a pillar block 35 adjacent to each side of the table T. This gripper member includes a lower gripper foot 61 secured to a rod 62 slidable through a bore 63 in the pillar block, the upper end of the rod having a suitable knob 64 attached thereto for the purpose of pulling the foot 61 upwardly from the body foot 21 and with respect to the material S. Normally, the foot 61 is urged in a downward direction by a helical compression spring 65 encircling the rod 62, its lower end bearing against the gripper foot 61 and its upper end bearing against the undersurface of the pillar block. A person can grasp the knob 64 and pull the rod and the foot upwardly away from the material S therebeneath.

Each gripper member 60 can be released individually by pulling upwardly on its rod 62 from the adjacent side of the table T, and it can be released simultaneously with release of the pressure bar 32 from the sheet material. As disclosed in the drawings, a bracket 70 is secured to the body 16 adjacent to each gripper member 60 by screws 71 or the like, and a lever 72 is pivotally mounted on a pivot pin 73 mounted in the bracket, one arm 74 of the lever extending outwardly toward a side 12 or 13 of the table and underlying an operating member 51, and the other arm 75 of the lever extending toward the gripper member 60 and having a slot or fork 76 through which the rod 62 extends.

Normally, the arms 74 of the gripper operating levers 72 will be spaced below the operating levers 51 so that the springs 65 can shift the gripper heads 61 downwardly against the sheet material S and secure it against the foot 21. However, upon movement of the operating levers 51 from either side to release the the pressure bar 32, the springs 41 will elevate the guide rods 33 and pressure bar 32 above the fabric S, and the operating arms 51 will be brought into contact with the gripper member release lever arms 74. Further downward movement of the operator arms 51 will then cause them to bear against the lever arm 74, the inner arms 75 of the levers 72 engaging the knobs 64 and elevating the gripper members 60 against the force of the springs 65, to elevate the gripper feet 61 from the sheet material S, thereby releasing the latter for full removal from the clamp mechanism C.

In the use of the apparatus, the clamp bar 32 is in its upper position, as disclosed in FIG. 6. The body clamp 29 is released along the table to the desired location as determined by alignment of the forward wall 18 of the body with the indicia 15 on the side scale 14. Thereafter, the knob 30 is turned to thread the shank 28 inwardly and move the clamp head 29 against one side 12 of the table and reactively pull the opposite head 24 against the opposite side 13 of the table, thereby securing the body 16 in place. The operating levers 51 are in their released position, such as shown in broken lines in FIG. 6, and the pressure arms 46 and pressure bar 32 are also in their upper position as disclosed in this figure. The sheet material S, such as drapery material, is placed upon the table T and its end portion placed over the foot 21 and against the forward wall 18. The gripper member 60 at one side of the table can be pulled upwardly until the end of the material S is against the wall 18, whereupon it will be released, allowing its spring 65 to force the gripper head 61 downwardly against the material and hold it against the body foot 21.

The operator can then move to the other side of the table and release the gripper member 60 at such side by pulling upwardly on its knob 64, the drapery material then being appropriately placed upon the foot 21 so that its edge is against the end wall 18 throughout the width of the material, whereupon the gripper member is released to cause its spring 65 to press the gripper head 61 against the material and hold it securely in place. The actuating lever 51 at the side of the table at which the operator is then located is grasped by the operator, who moves it in a forward direction to cause the arms 46 to swing downwardly and shift the rollers 49 against the pressure bar 32, shifting the latter downwardly toward the plate 21, the arms swinging over center to securely clamp the material S between the pressure bar 32 and the foot or plate 21. To facilitate such clamping action, the foot 21 may have longitudinal grooves 80 therein providing longitudinal gripping ribs 81 adapted to bear against the underface of the material S.

The operator can then sever the drapery material at the forward edge E of the table, the cut piece then being of the required length. The operator can release the severed sheet of material S from the clamp mechanism C by swinging one of the levers 51 in a rearward direction from either side of the table, which will release the pressure bar 32 and allow the springs 41 to elevate it from the sheet material S and the pressure foot 21. A continuation of the rearward downward movement of the operating lever 51 will then cause the levers 51 at both sides of the mechanism to engage the lever arms 74 and elevate the gripper member 60 against the force of their pressure springs 65, thereby freeing the sheet material which can then be removed from the clamp mechanism.

A new section of sheet material may then be placed on the table T and clamped in position by following the above described procedure, simultaneous release from either side of the table of the pressure bar 32 and of the gripper members 60 being effected in the manner set forth above.

The pressure bar 32 is flexible in a vertical direction and will accommodate itself to a variable thickness of material placed upon the foot 21. If, for example, a seam is present in the drapery materail S which will be thicker than the main portion of the material, the pressure bar will deflect around such seam and will grip the drapery material across its entire width.

The apparatus is capable of clamping different thicknesses of material in a highly effective manner, whether the material be very thin or relatively thick. As either lever 51 is moved in an upward and forward direction to rotate the shaft 45 and the clamp arms 46, the pressure bar 32 is brought against the material S, and if the material is relatively thick, the clamping action can be completed since the pillar blocks 35 can yield upwardly of the body 16 against the force of the springs 39 tending to keep them downwardly against the upper web portion 17 of the body. The springs 39 will exert a downward force on the pillar block 35 to insure the retention of the pressure bar 32 firmly clamped against the drapery or other material placed upon the foot portion 21 of the body.

From the drawings and foregoing description, it is evident that an apparatus has been provided which is relatively simple and which is of strong and sturdy construction. It is easy to operate, being readily manipulatable from either side of the table. Final clamping of the sheet material S can occur from either side of the table and release of the material from the clamp mechanism C, including the gripper members 60, can occur from the same side of the table, if desired, from which the final clamping action was effected. The yieldable retention of the pillar blocks 35 to the body 16 and the vertical flexibility of the pressure bar 32 insure an appropriate clamping action on a sheet of material that may vary in thickness across its width, and also enables the pressure bar to securely clamp different thicknesses of material, the machine readily accommodating itself to secure clamping of the thinnest material as well as relatively thick materials. As a result of the ability to operate the mechanism from either side, many steps are saved the operator in performing the clamping and the cutting action on the sheet material, which effects a corresponding saving in time and cost.

I claim:

1. In apparatus for clamping sheet material placed upon a table: an elongate body movable along the table; means for releasably securing said body to the table at selected positions thereon; supporting means secured to said body and extending forwardly thereof; an elongate clamping member extending lengthwise of said body below said supporting means; means mounting said clamping member on said supporting means for vertical movement with respect thereto and into and from engagement with the sheet material placed on the table; and means for shifting and retaining said clamping member downwardly of said supporting means and in clamping engagement with the sheet material on the table.

2. In apparatus for clamping sheet material placed upon a table: an elongate body movable along the table; means for releasably securing said body to the table at selected positions thereon; supporting means secured to said body and extending forwardly thereof; an elongate clamping member extending lengthwise of said body below said supporting means; means mounting said clamping member on said supporting means for vertical movement with respect thereto and into and from engagement with the sheet material placed on the table; a shaft rotatably mounted in said supporting means; spaced arm means secured to said shaft and engageable with said clamping member; and means for turning said shaft to force said arm means downwardly and shift said clamping member downwardly into clamping engagement with the sheet material on the table.

3. In apparatus for clamping sheet material placed upon a table: an elongate body movable along the table; means for releasably securing said body to the table at selected positions thereon; supporting means secured to said body and extending forwardly thereof; an elongate clamping member extending lengthwise of said body below said supporting means; means mounting said clamping member on said supporting means for vertical movement with respect thereto and into and from engagement with the sheet material placed on the table; a shaft rotatably mounted in said supporting means; spaced arm means secured to said shaft and engageable with said clamping member; and operating means secured to said shaft at opposite ends of said clamping member for turning said shaft to force said arm means downwardly and shift said clamping member downwardly into clamping engagement with the sheet material on the table.

4. In apparatus for clamping sheet material placed upon a table: an elongate body movable along the table; means for releasably securing said body to the table at selected positions thereon; supporting means secured to said body and extending forwardly thereof; an elongate clamping member extending lengthwise of said body below said supporting means; means mounting said clamping member on said supporting means for vertical movement with respect thereto and into and from engagement with the sheet material placed on the table; vertical guide rods secured to said clamping member and slidably mounted in said supporting means; spring means engaging said rods to urge said clamping member upwardly from engagement with the sheet material placed on the table; and means engaging said clamping member for shifting it downwardly against the force of said spring means into clamping engagement with the sheet material on the table.

5. In apparatus for clamping sheet material placed upon a table: an elongate body movable along the table; means for releasably securing said body to the table at selected positions thereon; supporting means secured to said body and extending forwardly thereof; an elongate clamping member extending lengthwise of said body below said supporting means; means mounting said clamping member on said supporting means for vertical movement with respect thereto and into and from engagement with the sheet material placed on the table; vertical guide rods secured to said clamping member and slidably mounted in said supporting means; spring means engaging said rods to urge said clamping member upwardly from engagement with the sheet material placed on the table; a shaft rotatably mounted in said supporting means; spaced arm means secured to said shaft and engageable with said clamping member; and means for turning said shaft to force said arm means downwardly and shift said clamping member downwardly against the force of said spring means into clamping engagement with the sheet material on the table.

6. In apparatus for clamping sheet material placed upon a table: an elongate body movable along the table; means for releasably securing said body to the table at selected positions thereon; supporting members secured to said body at spaced points therealong and extending forwardly thereof; an elongate clamping member extending lengthwise of said body below said supporting members; means mounting said clamping member on said supporting members for vertical movement with respect thereto and into and from engagement with the sheet material placed on the table; and means for shifting and retaining said clamping member downwardly of said supporting members and in clamping engagement with the sheet material on the table.

7. In apparatus for clamping sheet material placed upon a table: an elongate body movable along the table; means for releasably securing said body to the table at selected positions thereon; supporting members secured to said body at spaced points therealong and extending forwardly thereof; an elongate clamping member extending lengthwise of said body below said supporting members; means mounting said clamping member on said supporting members for vertical movement with respect thereto and into and from engagement with the sheet material placed on the table; a shaft rotatably mounted in said supporting members; spaced arm means secured to said shaft and engageable with said clamping member; and means for turning said shaft to force said arm means downwardly and shift said clamping member downwardly into clamping engagement with the sheet material on the table.

8. In apparatus for clamping sheet material placed upon a table: an elongate body movable along the table; means for releasably securing said body to the table at selected positions thereon; supporting members extending forwardly of said body at spaced points therealong; means yieldably connecting said supporting members to said body to permit said supporting members to move upwardly of said body; an elongate clamping member extending lengthwise of said body below said supporting members; means mounting said clamping member on said supporting members for vertical movement with respect thereto and into and from engagement with the sheet material placed on the table; and means for shifting and retaining said clamping member downwardly of said supporting members and in clamping engagement with the sheet material on the table.

9. In apparatus for clamping sheet material placed upon a table: an elongate body movable along the table; means for releasably securing said body to the table at selected positions thereon; supporting member extending forwardly of said body at spaced points therealong; means yieldably connecting said supporting members to said body to permit said supporting members to move upwardly of said body; an elongate clamping member extending lengthwise of said body below said supporting members; means mounting said clamping member on said supporting members for vertical movement with respect thereto and into and from engagement with the sheet material placed on the table; a shaft rotatably mounted in said supporting members; spaced arm means secured to said shaft and engageable with said clamping member; and means for turning said shaft to force said arm means downwardly and shift said clamping member downwardly into clamping engagement with the sheet material on the table.

10. In apparatus for clamping sheet material placed upon a table: an elongate body movable along the table; means for releasably securing said body to the table at selected positions thereon; supporting members extending forwardly of said body at spaced points therealong; means yieldably connecting said supporting members to said body to permit said supporting members to move upwardly of said body; an elongate clamping member extending lengthwise of said body below said supporting members; vertical guide rods secured to said clamping member and slidably mounted in said supporting members; spring means engaging said rods to urge said clamping member upwardly from engagement with the sheet material placed on the table; a shaft rotatably mounted in said supporting members; spaced arm means secured to said shaft and engageable with said clamping member; and means for turning said shaft to force said arm means downwardly and shift said clamping member downwardly into clamping engagement with the sheet material on the table.

11. In apparatus for clamping sheet material placed upon a table: an elongate body movable along the table; means for releasably securing said body to the table at selected positions thereon; supporting members extending forwardly of said body at spaced points therealong; means yieldably connecting said supporting members to said body to permit said supporting members to move upwardly of said body; an elongate clamping member extending lengthwise of said body below said supporting members; vertical guide rods secured to said clamping member and slidably mounted in said supporting members; spring means engaging said rods to urge said clamping member upwardly from engagement with the sheet material placed on the table; and means engaging said clamping member for shifting it downwardly against the force of said spring means into clamping engagement with the sheet material on the table.

12. In apparatus for clamping sheet material placed upon a table: an elongate body movable along the table; means for releasably securing said body to the table at selected positions thereon; supporting means secured to said body and extending forwardly thereof; an elongate clamping member extending lengthwise of said body below said supporting means; means mounting said clamping member on said supporting means for vertical movement with respect thereto and into and from engagement with the sheet material placed on the table; gripping members adjacent the end portions of said body; means mounting said gripping members for vertical movement into and from engagement with the sheet material placed on the table; means movable in one direction for shifting and retaining said clamping member downwardly of said supporting means and in clamping engagement with the sheet material on the table; and means engageable by said shifting means upon movement of said shifting means in the oppoist direction for elevating said gripping members from the sheet material on the table.

13. In apparatus for clamping sheet material placed upon a table: an elongate body movable along the table; means for releasably securing said body to the table at selected positions thereon; supporting means secured to said body and extending forwardly thereof; an elongate clamping member extending lengthwise of said body below said supporting means; means mounting said clamping member on said supporting means for vertical movement with respect thereto and into and from engagement with the sheet material placed on the table; gripping members adjacent the end portions of said body; means mounting said gripping members for vertical movement into and from engagement with the sheet material placed on the table; a shaft rotatably mounted in said supporting means; spaced arm means secured to said shaft and engageable with said clamping member; means movable in one direction for turning said shaft in a direction to force said arm means downwardly and shift said clamping member downwardly into clamping engagement with the sheet material on the table; and means engageable by said turning means upon movement of said turning means in the opposite direction for elevating said gripping members from the sheet material on the table.

14. In apparatus for clamping sheet material placed upon a table: an elongate body movable along the table; means for releasably securing said body to the table at selected positions thereon; supporting means secured to said body and extending forwardly thereof; an elongate clamping member extending lengthwise of said body below said supporting means; means mounting said clamping member on said supporting means for vertical movement with respect thereto and into and from engagement with the sheet material placed on the table; gripping members adjacent the end portions of said body; means mounting said gripping members for vertical movement into and from engagement with the sheet material placed on the table; a shaft rotatably mounted in said supporting means; spaced arm means secured to said shaft and engageable with said clamping member; a lever arm secured to said shaft at each end portion thereof and movable in one direction to force said arm means downwardly and shift said clamping member downwardly into clamping engagement with the sheet material on the table; and means engaging each of said gripping members and engageable by said lever arms upon movement of said lever arms in the opposite direction for elevating said gripping members from the sheet material on the table.

15. In apparatus for clamping sheet material placed upon a table: an elongate body movable along the table; means for releasably securing said body to the table at selected positions thereon; supporting members secured to said body at spaced points therealong and extending forwardly thereof; an elongate clamping member extending lengthwise of said body below said supporting members; vertical guide rods secured to said clamping member and slidably mounted in said supporting members; spring means engaging said rods to urge said clamping member upwardly from engagement with sheet material placed on the table; gripping members adjacent the end portions of said body; means mounting said gripping members for vertical movement into and from engagement with the sheet material placed on the table; a shaft rotatably mounted in said supporting members; spaced arm means secured to said shaft and engageable with said clamping members; a lever arm secured to said shaft at each end portion thereof and movable in one direction to force said arm means downwardly and shift said clamping member downwardly into clamping engagement with the sheet material on the table; and means engaging each of said gripping members and engaged by said lever arms upon movement of said lever arms in the opposite direction for elevating said gripping members from the sheet material on the table.

16. In apparatus for clamping sheet material placed upon a table: an elongate body movable along the table; means for releasably securing said body to the table at selected positions thereon; supporting members extending forwardly of said body at spaced points therealong; means yieldably connecting said supporting members to said body to permit said supporting members to move upwardly of said body; an elongate clamping member extending lengthwise of said body below said supporting members; vertical guide rods secured to said clamping member and slidably mounted in said supporting members; spring means engaging said rods to urge said clamping member upwardly from engagement with sheet material placed on the table; gripping members adjacent the end portions of said body; means mounting said gripping members for vertical movement into and from engagement with the sheet material placed on the table; a shaft rotatably mounted in said supporting members; spaced arm means secured to said shaft and engageable with said clamping member; a lever arm secured to said shaft at each end portion thereof and movable in one direction to force said arm means downwardly and shift said clamping member downwardly into clamping engagement with the sheet material on the table; and means engaging each of said gripping members and engaged by said lever arms upon movement of said lever arms in the opposite direction for elevating said gripping members from the sheet material on the table.

17. In apparatus as defined in claim 1; wherein said clamping member is deflectable in a vertical direction to conform to varying thicknesses of sheet material on the table.

18. In apparatus for clamping sheet material placed upon a table as defined in claim 16; wherein said clamping member is constructed and arranged to be deflectable vertically to conform to variations of thickness of sheet material on the table.

References Cited by the Examiner

UNITED STATES PATENTS

| | | | |
|---|---|---|---|
| 469,170 | 2/1892 | Olson | 38—108 |
| 3,168,304 | 2/1965 | Condon | 269—304 |

ROBERT C. RIORDON, *Primary Examiner.*

J. F. McKEOWN, *Examiner.*